(12) United States Patent
DellAngelo et al.

(10) Patent No.: US 10,289,104 B2
(45) Date of Patent: May 14, 2019

(54) SYSTEMS AND METHODS FOR CONTROLLING A CONVEYOR SYSTEM DURING PRODUCT CHANGEOVERS

(71) Applicant: UNITED STATES GYPSUM COMPANY, Chicago, IL (US)

(72) Inventors: Scott M. DellAngelo, Plainfield, IL (US); Robert Wykoff, Reno, NV (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 0 days.

(21) Appl. No.: 15/987,484

(22) Filed: May 23, 2018

(65) Prior Publication Data

US 2018/0267517 A1 Sep. 20, 2018

Related U.S. Application Data

(62) Division of application No. 14/481,358, filed on Sep. 9, 2014, now Pat. No. 9,983,574.

(Continued)

(51) Int. Cl.
*G05B 19/418* (2006.01)
*F26B 15/12* (2006.01)
(Continued)

(52) U.S. Cl.
CPC .......... *G05B 19/4189* (2013.01); *B28B 11/24* (2013.01); *B28B 17/0081* (2013.01);
(Continued)

(58) Field of Classification Search
CPC ........ G05B 19/4189; G05B 2219/2621; F26B 15/12; B28B 17/0081; B28B 11/24; B28B 19/0092; Y02P 90/28; Y02P 80/40
(Continued)

(56) References Cited

U.S. PATENT DOCUMENTS 2,885,616 A 5/1959 Anger et al.
3,043,014 A 7/1962 Loechl
(Continued)

FOREIGN PATENT DOCUMENTS

CN 202045739 U 11/2011
EP 0422833 A2 * 4/1991 ............. B28B 5/027
(Continued)

OTHER PUBLICATIONS

Russian Search Report from corresponding Russian Patent Application No. 2016113994, dated Jun. 8, 2018.

*Primary Examiner* — Brian W Wathen
*Assistant Examiner* — Mohammed Shafayet
(74) *Attorney, Agent, or Firm* — Greer, Burns & Crain, Ltd.; Pradip Sahu; Philip T. Petti

(57) ABSTRACT

System for controlling a conveyor system in a wallboard production line, including a computer processor and a deadband tuning module for controlling at least one of a line speed of a conveyor belt, a foam air amount for a slurry, and an amount of water deposited into a mixer. The deadband tuning module calibrates and sets a hysteresis threshold value based on input data of at least one of the line speed, the foam air amount, and the amount of water. The input data is collected over a predetermined period. A database is provided for storing at least one statistical information of the input data during the predetermined period. The deadband tuning module determines a deadband range based on the hysteresis threshold value and the at least one statistical information using the processor.

3 Claims, 8 Drawing Sheets

Related U.S. Application Data

(60) Provisional application No. 61/884,618, filed on Sep. 30, 2013.

(51) Int. Cl.
*B28B 19/00* (2006.01)
*B28B 11/24* (2006.01)
*B28B 17/00* (2006.01)

(52) U.S. Cl.
CPC .......... *B28B 19/0092* (2013.01); *F26B 15/12* (2013.01); *G05B 2219/2621* (2013.01); *Y02P 80/40* (2015.11); *Y02P 90/28* (2015.11)

(58) Field of Classification Search
USPC ........................................................ 700/112
See application file for complete search history.

(56) References Cited

U.S. PATENT DOCUMENTS

| | | | |
|---|---|---|---|
| 3,050,670 A | 8/1962 | Anger et al. | |
| 4,154,004 A | 5/1979 | Trötscher | |
| 4,250,435 A | 2/1981 | Alley et al. | |
| 4,406,402 A | 9/1983 | Henriques | |
| 4,512,225 A | 4/1985 | Green | |
| 4,956,530 A | 9/1990 | Koch | |
| 5,030,312 A | 7/1991 | Williams et al. | |
| 5,573,333 A * | 11/1996 | Dahlman | B01F 15/00136 137/4 |
| 6,041,264 A * | 3/2000 | Wruck | G05B 5/01 700/40 |
| 6,309,144 B1 * | 10/2001 | Ingraham | B65G 51/035 406/19 |
| RE37,557 E | 2/2002 | Bahner et al. | |
| 6,418,638 B1 * | 7/2002 | Forster | B28B 11/24 156/39 |
| 6,494,609 B1 | 12/2002 | Wittbold et al. | |
| 6,636,036 B1 * | 10/2003 | Schroeder | G01D 1/18 324/207.12 |
| 6,866,492 B2 | 3/2005 | Hauber et al. | |
| 6,868,883 B2 * | 3/2005 | Benedetti | B28B 11/16 156/353 |
| 6,902,615 B2 | 6/2005 | Shoshany | |
| 6,932,863 B2 | 8/2005 | Shoshany | |
| 6,986,812 B2 | 1/2006 | Dubey et al. | |
| 7,149,597 B2 * | 12/2006 | Billings | G05B 13/021 700/117 |
| 7,155,319 B2 * | 12/2006 | Nangoy | G05B 13/021 700/281 |
| 7,195,115 B2 | 3/2007 | DePaso | |
| 7,401,695 B2 | 7/2008 | DerMarderosian | |
| 7,754,052 B2 * | 7/2010 | Frank | B28B 5/027 156/346 |
| 8,163,352 B2 * | 4/2012 | Jones | B28B 1/08 427/180 |
| 8,403,447 B1 * | 3/2013 | Gardner | G06K 15/102 347/12 |
| 8,425,173 B2 | 4/2013 | Lert et al. | |
| 2004/0134585 A1 * | 7/2004 | Callais | B28B 17/023 156/39 |
| 2005/0090932 A1 | 4/2005 | Belmann et al. | |
| 2007/0150079 A1 * | 6/2007 | Blevins | G05B 23/0251 700/41 |
| 2008/0086905 A1 | 4/2008 | Yanes | |
| 2009/0099687 A1 * | 4/2009 | Nordling | B65C 1/02 700/230 |
| 2009/0245616 A1 * | 10/2009 | De La Ballina | A21C 9/08 382/141 |
| 2010/0030373 A1 * | 2/2010 | Lee | B65B 35/44 700/223 |
| 2010/0227073 A1 * | 9/2010 | Frank | B28B 1/526 427/420 |
| 2012/0290126 A1 * | 11/2012 | Combs | B65G 43/10 700/230 |
| 2013/0000845 A1 * | 1/2013 | Lu | G01B 21/08 156/345.13 |
| 2013/0060376 A1 * | 3/2013 | Forster | B65H 5/085 700/218 |
| 2013/0090747 A1 | 4/2013 | Grieb et al. | |
| 2014/0244030 A1 | 8/2014 | Combs et al. | |
| 2014/0277698 A1 * | 9/2014 | Combs | B65G 43/10 700/230 |
| 2014/0288697 A1 | 9/2014 | Sørensen et al. | |
| 2015/0197403 A1 * | 7/2015 | Moesli | B65G 47/31 198/464.4 |

FOREIGN PATENT DOCUMENTS

| | | |
|---|---|---|
| EP | 0422833 A2 | 4/1991 |
| SU | 1113334 A1 | 9/1984 |

* cited by examiner

SYSTEMS AND METHODS FOR CONTROLLING A CONVEYOR SYSTEM DURING PRODUCT CHANGEOVERS

PRIORITY CLAIM AND CROSS-REFERENCE

The present application is a Divisional application of U.S. patent application Ser. No. 14/481,358 filed Sep. 9, 2014, which is incorporated herein by reference in its entirety. The present application also claims priority under 35 U.S.C. § 119(e) from U.S. Provisional Application Ser. No. 61/884,618, filed Sep. 30, 2013, which is also incorporated herein by reference in its entirety.

BACKGROUND

The present disclosure generally relates to systems and methods for preparing cement or gypsum products, and more particularly relates to improved systems and methods for controlling a line speed of a conveyor system during product changeovers in a wallboard production line.

Conventionally, gypsum products, such as calcium sulfate dihydrate, are prepared with typical basic ingredients, including calcined gypsum, such as calcium sulfate hemihydrate or anhydrite, and water. A slurry mixer is typically used for supplying agitated gypsum slurry to the wallboard production line. Several types of gypsum wallboard manufacture are described in co-assigned U.S. Pat. Nos. 6,494,609 and 6,986,812; both of which are incorporated by reference.

As is well known in the art, a mixer is provided for uniformly dispersing calcined gypsum into water to form a slurry, and then the slurry is cast into a desired shaped mold or onto a surface to allow the slurry to set and form hardened gypsum by chemical reaction of the calcined gypsum with water. A lightweight gypsum product is provided by uniformly mixing aqueous foam into the slurry to produce air bubbles. This results in a uniform distribution of voids in the set gypsum product when the bubbles are confined in the slurry before the gypsum hardens.

As the slurry travels downstream toward a forming plate on a conveyor system, a thickness of the slurry is determined by a predetermined location of the forming plate above a conveyor belt. Depending on a mass rate of the slurry traveling on the conveyor belt relative to a line speed of the conveyor system, maintaining a generally laminar flow of the slurry before the forming plate is not readily achievable. An optimal line speed generally refers to a maximum possible speed that the conveyor system can support without forming a disruptive slurry head immediately before the forming plate.

When the line speed is too fast relative to the mass rate of the slurry traveling on the conveyor belt, excessive slurry that cannot pass through the forming plate creates the slurry head in front of the forming plate, causing uneven accumulation and frequent clogging of the forming plate in the production line. Specifically, when the product changeover is initiated, a composition or density rate of the gypsum product changes and also alters the mass rate of the slurry based on the product changeover requirements.

Therefore, there is a need for controlling the line speed of the conveyor system during the product changeovers such that the optimal line speed is maintained for the laminar flow of the slurry.

As the slurry advances on the conveyor belt, and is deposited between two paper liners below the forming plate, a thickness of the wallboard being formed is equalized. After passing through the forming plate, the formed wallboard continues to travel on the conveyor belt for a predetermined period to allow the gypsum in the wallboard to set. Next, the set continuous strip of wallboard is cut into predetermined lengths, forming panels or boards, and each cut board then passes through a hydration section and subsequently a drying section having an oven or kiln on single or multiple decked roller conveyors, such that heated air is blown across an upper and lower faces of the board for drying.

However, when gaps between adjacent boards are too wide, exposed edges of the board become parched or toasted by the heated air, and the toasted edges tend to warp, buckle, pop, crumble or otherwise distort the board due to uneven drying. As a result, the boards are sent through the drying kiln side-by-side or end-to-end to reduce the exposed edges and any associated distortions of the boards. While the hydration section and the drying section are part of the conveyor system as a whole, each section has its own line speed for the corresponding conveyor belt.

Therefore, there is a need for controlling the line speed of the conveyor system for the cut wallboard panels going into the kiln such that the adjacent boards are touching each other in an end-to-end relationship to prevent toasting the edges during heat treatment.

SUMMARY

The present disclosure is directed to systems and methods for controlling a line speed of a conveyor system during product changeovers in a wallboard production line. One aspect of the present control system is that, as described in further detail below, a volumetric buildup of the slurry head at the forming plate is controlled by automatically adjusting the line speed of the conveyor system based on a distance to the slurry head measured by a laser sensor. Positioned near the forming plate, the laser sensor determines whether the buildup of the slurry head is located within a predetermined distance. Based on the distance between the slurry head and the sensor, the line speed of the conveyor system is adjusted.

Another important aspect is that the present control system operates through a computer algorithm to control the line speed of the conveyor system for adjusting a mixer output as an additional volumetric control of the slurry. More specifically, the present control system adjusts the line speed of the conveyor system during a running change of the products in the wallboard production line for inhibiting disruption caused by the change in mass rate of the stucco/gypsum materials. The disruption causes an overflow in a mixer output, resulting in a condition known as "overshoot." Adjusting the line speed of the conveyor system provides a linear variation of the mass rate change, and reduces or eliminates the overshoot during the changeover period.

In yet another aspect, the present control system adjusts the line speed of the conveyor system for the cut wallboard panels that are sent through the drying kiln. A conventional optical switch is used to measure a gap between adjacent wallboard panels together with an associated length of each wallboard panel for calculating a predetermined line speed of the conveyor system based on the measured gap and length. Closing the gap between the adjacent panels is achieved by implementing the calculated line speed in the conveyor system. Consequently, an amount of wallboard waste during the heat treatment of the boards is reduced, and a structural integrity of the wallboard is preserved.

In one embodiment, after one year trial period of the present control system, it has been discovered that a main programmable logic control delay of the conveyor system has been reduced by approximately 92%, a wet slurry waste has been reduced by approximately 54%, and an amount of dry ingredient waste, such as the calcined gypsum, has been reduced by approximately 7%. Specifically, a volume of the slurry introduced to the conveyor system has been maintained consistently during the changeover period, and as a result, the present control system reduced a number of production interruptions, and waste materials, thereby reducing overall operational costs and delay time.

More specifically, a system is provided for controlling a line speed of a conveyor belt of a conveyor system during product changeovers in a wallboard production line. Included in the system are a computer processor, a central control module for controlling operation of a position sensor and a database. The position sensor is located on top of a conveyor table for providing positional information of a slurry head formed in front of a forming plate of the conveyor system. A position detection module is provided for receiving a position signal from the position sensor, and determining whether the slurry head is located within a predetermined distance relative to the position sensor based on the position signal. A speed adjustment module is provided for regulating the line speed of the conveyor belt based on the position signal using the processor.

In another embodiment, a system is provided for controlling a line speed of a conveyor belt of a conveyor system during product changeovers in a wallboard production line. Included in the system are a computer processor, a calculation module for calculating a predetermined mass rate of a supply of ingredients transported on the conveyor belt and deposited into a mixer during a product changeover period, a speed adjustment module for adjusting the line speed of the conveyor belt, using the processor, based on at least one of the predetermined mass rate and the line speed of the conveyor belt for reducing an overshoot during said product changeover period.

In yet another embodiment, a system is provided for controlling a conveyor system in a wallboard production line, including a computer processor and a deadband tuning module for controlling at least one of a line speed of a conveyor belt, a foam air amount for a slurry, and an amount of water deposited into a mixer. The deadband tuning module calibrates and sets a hysteresis threshold value based on input data of at least one of the line speed, the foam air amount, and the amount of water. The input data is collected over a predetermined period, a database is provided for storing at least one statistical information of the input data during the predetermined period; and wherein the deadband tuning module determines a deadband range based on the hysteresis threshold value and the at least one statistical information using the processor.

In still another embodiment, a system is provided for controlling a line speed of a conveyor belt of a conveyor system in a wallboard production line, and includes a computer processor, a hydration section for storing a plurality of wallboard panels cut by a cutter, a drying section having a drying kiln for drying the plurality of wallboard panels, and a butting switch disposed in the hydration section at a predetermined distance from the drying section for measuring a gap between adjacent wallboard panels and a longitudinal wallboard length. The conveyor belt in the hydration section is operated at a hydration section speed, and the conveyor belt in the drying section is operated at a drying section speed, the hydration and drying section speeds are set differently. A calculation module is provided for calculating a predetermined gap adjustment value based on at least one of the hydration section speed, the drying section speed, said gap, and the longitudinal wallboard length; and a speed adjustment module is provided for adjusting the line speed of the conveyor belt in the hydration and drying sections based on the gap adjustment value using the processor.

DETAILED DESCRIPTION

Figure 1:
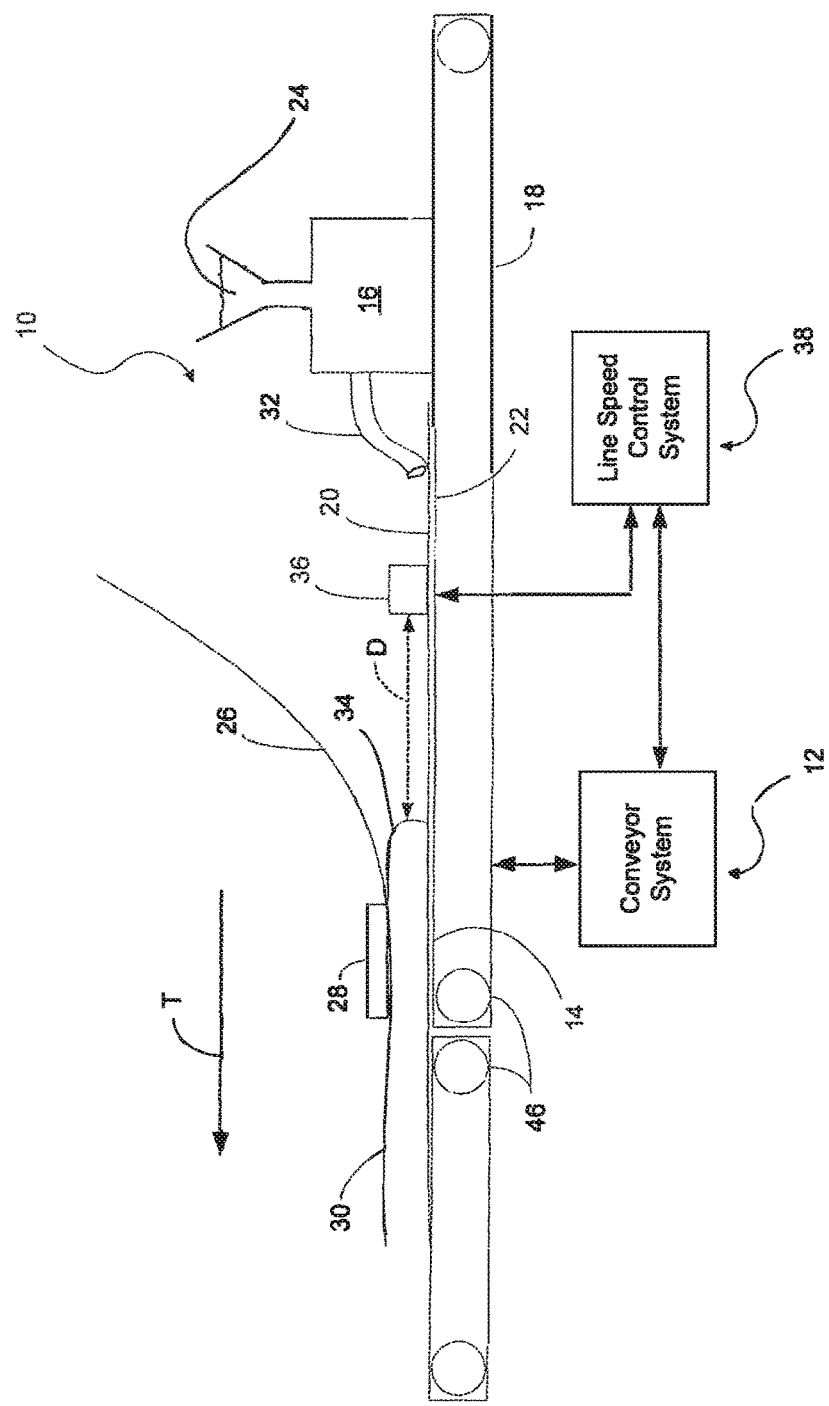
FIG. 1 is a diagrammatic elevation view of a partial wallboard production line suitable for use with the present control system, featuring a slurry mixer.

Referring now to FIG. 1, the present control system is generally designated 10, and is designed to control a line speed of a conveyor system, generally designated 12, in a wallboard production line 14. A mixer 16 configured for mixing and dispensing a slurry is disposed above the production line 14 that includes a conveyor table 18 upon which a web of face paper 20 is moved on a conveyor belt 22 in a direction of travel designated by the arrow T. A supply of stucco 24 having various ingredients is delivered to the mixing for deposition upon the face paper 20 located on the conveyer belt 22.

While a variety of settable slurries are contemplated, the present control system 10 is particularly designed for producing stucco/gypsum panels. In many applications, the slurry is formulated to include varying amounts of gypsum, aggregate, water, accelerators, plasticizers, foaming agents, fillers, cement, and/or other ingredients well known in the art. The relative amounts of these ingredients, including the elimination of some of the above or the addition of other ingredients, may vary to suit requirements for a particular product.

A web of top or backing paper 26 is also moved above the conveyor belt 22 in the direction T, sandwiching the slurry between the face and top papers 20, 26 beneath a forming plate 28 for shaping and molding a wallboard 30. A spout 32 attached to the mixer 16 is located upstream on the wallboard production line 14, and the slurry is dispensed from the spout on the web of face paper 20 during operation of the conveyor system 12. A slurry head 34 is formed in front of the forming plate 28, and is detected by a position sensor 36, such as a laser emitter, for measuring a distance D between the slurry head and the position sensor. Based on the distance D, the control system 10 adjusts the line speed of the conveyor belt 22, and also controls a volumetric output of the slurry dispensed from the mixer 16 based on the line speed.

An important feature of the present control system 10 is that the slurry dispensing operation is controlled by a line speed control system, generally designated 38. In a preferred embodiment, the line speed control system 38 is a software installed computer device having programmable modules for various functions. As used herein, the term "module" may refer to, be part of, or include an Application Specific Integrated Circuit (ASIC), an electronic circuit, a processor (shared, dedicated, or group), a programmable logic controller (PLC) and/or memory (shared, dedicated, or group) that execute one or more software or firmware programs, a combinational logic circuit, and/or other suitable components that provide the described functionality.

As is known in the art, the module may be implemented with a proportional-integral-derivative (PID) controller, and other variations, such as proportional-integral, proportional-derivative, and proportional controllers, as either stand-alone controllers or configurable software modules within the present control system 10. Another important feature of the present control system 10 is that any module can be tuned and configured to have an adjustable deadband range. Tuning algorithms include, but not limited to, non-parametric methods, such as a conventional closed-loop tuning method or relay feedback test to provide a satisfactory and consistent performance in the presence of measurement noise and varying disturbances. A more detailed description of the tuning algorithm is provided below in discussion relating to FIG. 2.

Although the children modules residing in their respective parent modules are shown, the broad teachings of the present system can be implemented in a variety of forms. Thus, while this disclosure includes particular examples and arrangements of the modules, the scope of the present device should not be so limited since other modifications will become apparent to the skilled practitioner.

Figure 2:
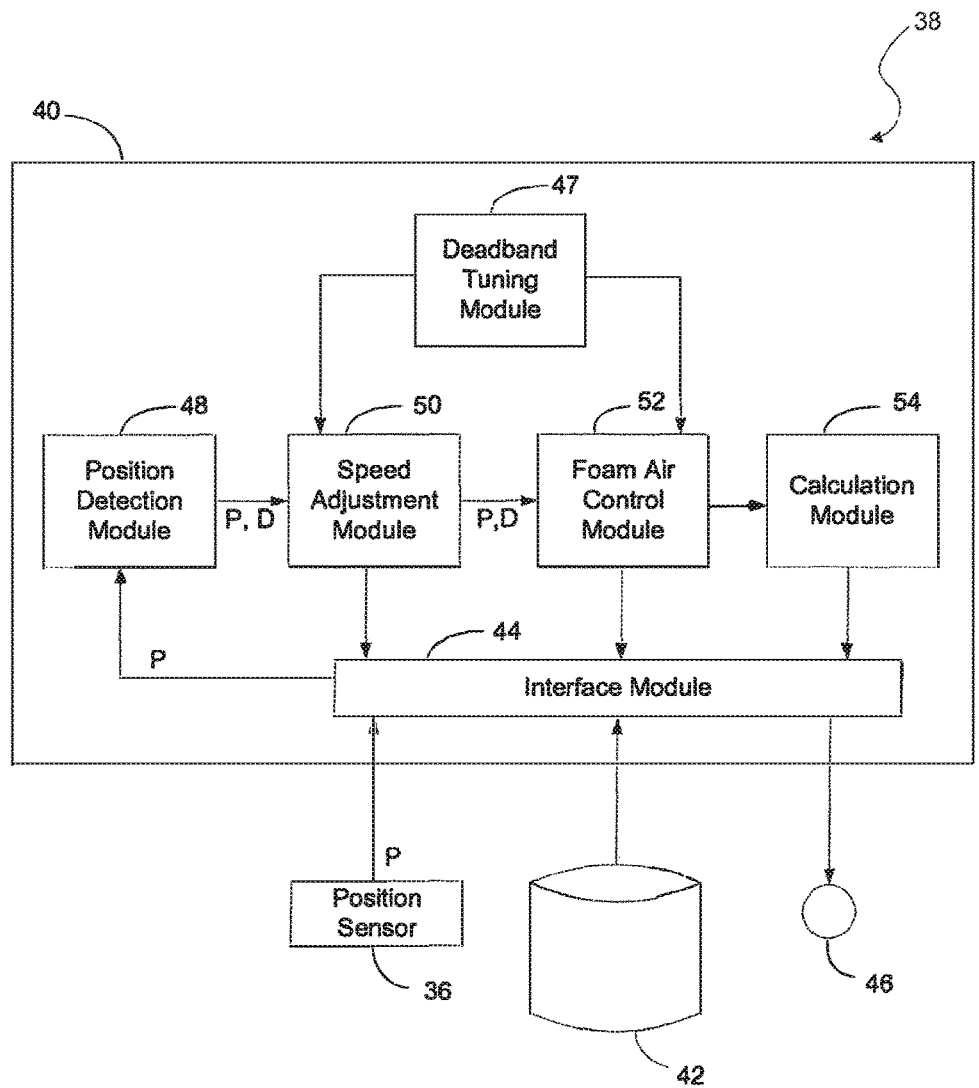
FIG. 2 is a functional block diagram of the present control system featuring functional modules.

Referring now to FIGS. 1 and 2, it is preferred that the present line speed control system 38 includes a central control module (CCM) 40, the position sensor 36, and a database 42. Overall operation of the line speed control system 38 is controlled by the CCM 40. Positional information of the slurry head 34 is provided by the position sensor 36 located preferably on top of the conveyor table 18. All relevant information can be stored in the database 42 for retrieval by the CCM 40, e.g., as a data storage device and/or a machine readable data storage medium carrying computer programs.

Also included in the CCM 40 is an interface module 44, which provides an interface between the CCM 40, the position sensor 36, and the database 42. The interface module 44 also controls operation of, for example, conveyor belt motors 46, and other related system devices, services, and applications. The other devices, services, and applications may include, but are not limited to, one or more software or hardware components, as are known in the art. The interface module 44 also receives signals, which are communicated to the respective modules, such as the CCM 40 and its children modules 44, 47, 48, 50, 52, 54.

Regarding the children modules 44, 47, 48, 50, 52, 54, each child module can be tuned by a deadband tuning module 47. While the deadband tuning module 47 is shown to control a line speed of the conveyor belt 22 and a foam air amount for the slurry in the FIG. 2 embodiment, the deadband tuning module 47 can be used for modules controlling other devices, such as a water pump (not shown) for the mixer 16. More specifically, a hysteresis threshold value HYS is calibrated and set by the deadband tuning module 47 using calibration software based on input data DATA. As an example only, in the case of the water pump, the input data DATA refer to relevant information about an amount of water deposited into the mixer 16, and are collected in the database 42 by the CCM 40 over a predetermined period, e.g., 2-3 minutes. Statistical information, such as a minimum, a maximum, and an average amount of water are calculated and saved in the database 42 during the predetermined period. The hysteresis threshold value HYS is determined based on a statistical normal distribution of the collected input data DATA.

In a preferred embodiment, a steady-state control value, two to three times the standard deviation of the input data DATA, is used for determining the deadband range such that the measurement noise or quantization noise, and other similar changes do not cause frequent, unstable oscillating or repeated changes in the amount of water delivered to the mixer 16. An exemplary deadband range DEADBAND may be defined as provided by expression 1.

$$\text{DEADBAND} = f\{\text{HYS}, \text{DATA}\} \quad (1)$$

An automatic adjustment of the deadband range DEADBAND is achieved by calculating the hysteresis threshold value HYS based on at least one of the statistical data, such as the minimum, maximum, average, and standard deviation values via the deadband tuning module 47. However, the deadband range DEADBAND can also be calibrated and overridden manually for locking in the deadband range at a desired offset from a predetermined value based on the input data DATA. Although the deadband tuning module 47 is shown as a child module of the CCM 40, the deadband tuning module 47 can be incorporated into the other embodiments of the present control system 10 as a separate, independent control system.

A position detection module 48 receives a position signal P from the position sensor 36 via the interface module 44, and determines whether the slurry head 34 is located within a predetermined distance relative to the position sensor based on the position signal P. During a product changeover, the slurry density and/or the composition rate of the stucco and water are changed based on product changeover requirements. For example, a wallboard "A" production line comes to an end, and the conveyor system 12 prepares for a wallboard "B" production line by modifying amounts of stucco and water mixed in the mixer 16. A variation in the amounts of stucco and water triggers a change in the slurry density and/or the composition rate, and consequently alters the distance D between the slurry head 34 and the position sensor 36.

Controlling an amount and a location of the slurry head 34 accumulating near the forming plate 28 is achieved by adjusting the line speed of the conveyor belt 22. A speed adjustment module 50 is provided for regulating the line speed of the conveyor belt 22 in response to the position signal P. It is preferred that a foam air control module 52 is also provided for controlling an amount of air mixed into the slurry in response to the position signal P. Mixing aqueous foam into the slurry to produce air bubbles is also an effective way of controlling the slurry head 34. Although the speed adjustment module 50 and the foam air control module 52 can be separately executed, both modules 50, 52 are preferably simultaneously executed in tandem during the product changeover.

Another important aspect of the present line speed control system 38 is that it reduces any disruption caused by the change in mass rate of the stucco/gypsum materials entering into the mixer 16. A desired result of the line speed control system 38 is maintaining a steady, consistent mass rate during the changeover period. An abrupt mass rate change during the product changeover period causes an overshoot in a mixer output. Changing the line speed of the conveyor system 12 provides a linear variation of the mass rate change, and consequently reduces or eliminates the overshoot.

In a preferred embodiment, a calculation module 54 is provided for calculating a predetermined mass rate MASS and a predetermined line speed LNSPD. The mass rate MASS refers to a desired mass rate of ingredients, such as stucco 24, transported on the conveyor belt 22 and deposited into the mixer 16 during the product changeover period. As described in further detail below, the mass rate MASS is determined based on at least one of a first ingredient mass rate IMR1, and a current conveyor line speed CLS. An exemplary mass rate MASS may be defined as provided by expression 2.

$$\text{MASS}=f\{\text{IMR1,CLS}\} \quad (2)$$

As for the line speed LNSPD, it refers to a desired line speed of the conveyor belt 22 upon which the ingredients are transported upstream on the production line 14 toward the mixer 16 during the product changeover period. The line speed LNSPD is determined based on at least one of the first ingredient mass rate IMR1 and a second ingredient mass rate IMR2. An exemplary line speed LNSPD may be defined as provided by expression 3.

$$\text{LNSPD}=f\{\text{IMR1,IMR2}\} \quad (3)$$

Adjusting the line speed of the conveyor belt 22 based on at least one of the mass rate MASS and the line speed LNSPD provides a smooth transition during the product changeover period.

Figure 3:
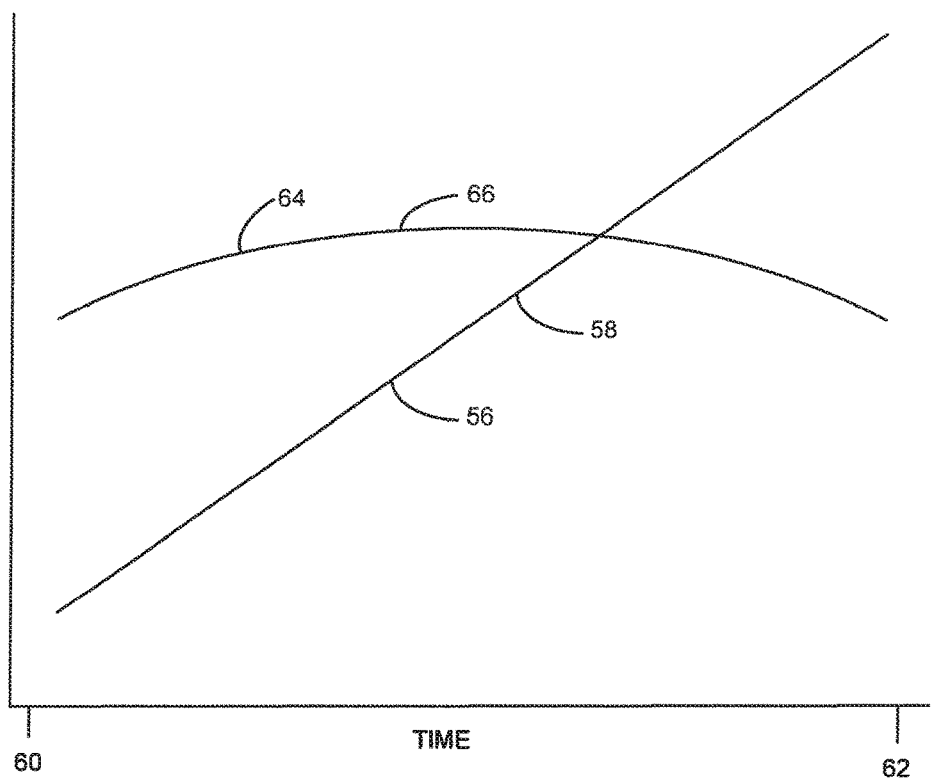
FIGS. 3 and 4 are graphical representations of an exemplary mass rate change during a product changeover period.

Referring now to FIG. 3, a graphical illustration of exemplary stucco mass rate changes is shown during the product changeover period when the line speed of the conveyor belt 22 is not controlled by the line speed control system 38. In some applications, the product changeover requires transportation of stucco 24 having a higher mass rate than before the changeover period. Typically, a first mass rate change 56, measured in pound per thousand square feet (lb/msf), exhibits a linear increasing slope 58 during a changeover period TIME defined by time between a first setpoint 60 and a second setpoint 62, indicating a steady flow of the stucco 24 being transported on the conveyor belt 22. However, a second mass rate change 64, measured in pound per minute (lb/min), corresponds to a non-linear parabolic curve 66, indicating presence of the overshoot.

Figure 4:
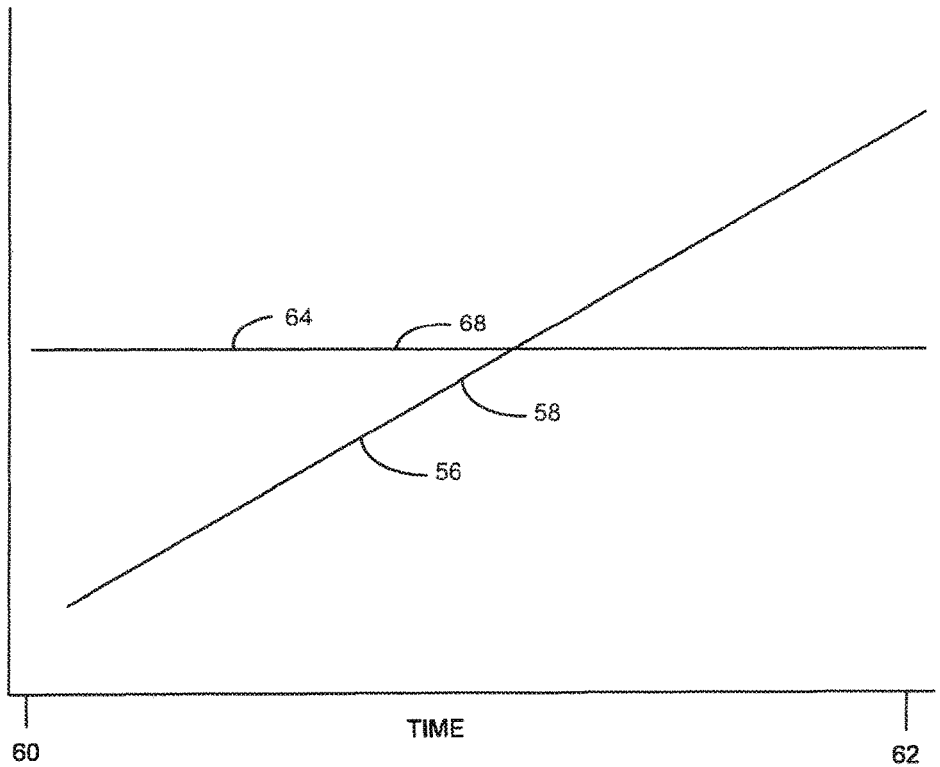

Referring now to FIG. 4, the graphical illustration of FIG. 3 is shown when the line speed of the conveyor belt 22 is controlled and adjusted by the present line speed control system 38. Components shared with FIG. 3 are designated with identical reference numbers. A major difference featured in this figure is that the second mass rate change 64 corresponds to a linear flat line 68, indicating absence of the overshoot. Avoidance of the overshoot is achieved by adjusting the line speed of the conveyor belt 22 for sustaining the mass rate change 64 linear or constant. As discussed above, the line speed of the conveyor belt 22 is adjusted based on at least one of the mass rate MASS and the line speed LNSPD, both of which are calculated by the calculation module 54.

Returning to the expressions (2) and (3) described above, the first ingredient mass rate IMR1 refers to a mass rate of the ingredient or stucco 24, transported on the conveyor belt 22 during the product changeover period, and is measured in pound per thousand square feet (lb/msf). Similarly, the second ingredient mass rate IMR2 refers to the mass rate of the identical stucco 24 transported during the changeover period, and is measured in pound per minute (lb/min). Exemplary second ingredient mass rate IMR2 and line speed LNSPD may be defined as provided by expressions 4 and 5.

$$IMR2 = IMR1 * LNSPD * \frac{W}{CONV} \quad (4)$$

$$LNSPD = \frac{IMR2}{IMR1} * \frac{CONV}{W} \quad (5)$$

where W denotes a width of the wallboard 30, e.g., 4 feet, and CONV denotes a conversion factor for the unit used in IMR1 (msf), i.e., 1,000.

An important aspect of the line speed control system 38 is that these calculations are performed automatically by the calculation module 54 during the product changeover period TIME, and the line speed of the conveyor belt 22 is adjusted to the calculated line speed LNSPD by the speed adjustment module 50 for providing a smooth transition of the running change in the wallboard production line 14 during the product changeover period.

Figure 5:
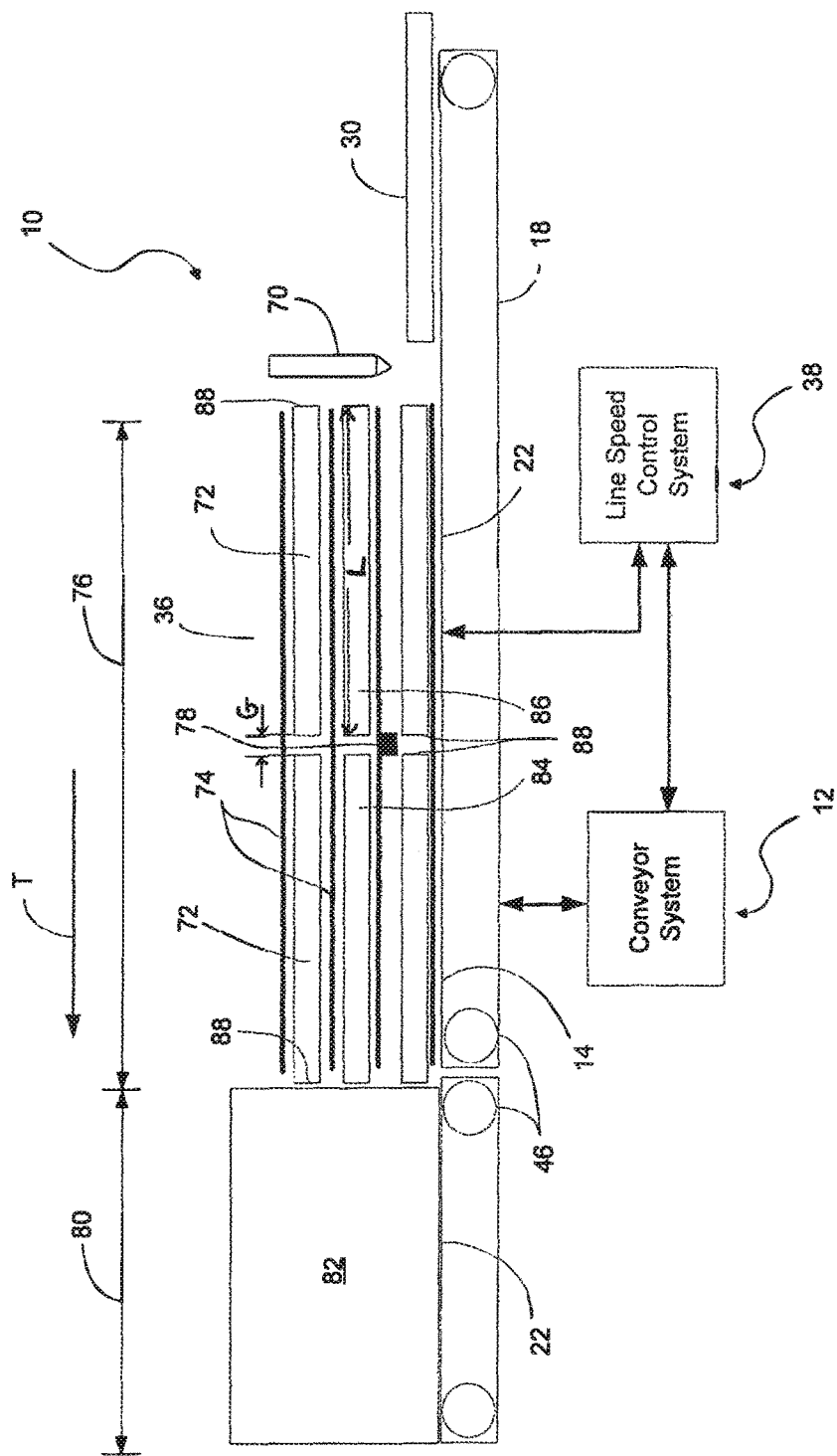
FIG. 5 is a diagrammatic elevation view of a partial wallboard production line suitable for use with the present control system, featuring a drying kiln.

Referring now to FIGS. 1 and 5, as the slurry passes through the forming plate 28, the wallboard 30 is formed and continues to travel on the conveyor belt 22 in the direction T for a predetermined period to allow setting for gypsum of the wallboard. A cutter 70 is provided for cutting a continuous strip of wallboard 30 at a predetermined length L, and then each cut board segment or panel 72 is sequentially stacked up on one or more decks 74 disposed in a hydration section 76.

Included in the hydration section 76 is a butting switch 78, such as an optical switch, disposed at a predetermined distance, e.g., 40 feet, from a drying section 80, having a drying oven or kiln 82. The butting switch 78 is disposed on at least one of the decks 74, and is used to measure a gap G between adjacent board segments 84, 86, and the predetermined board length L. Another important aspect of the present line speed control system 38 is that the butting control can be performed using a single butting switch 78 disposed on a single deck 74.

Each section 76, 80 has its own different line speed for the corresponding conveyor belt 22. Specifically, the hydration section 76 is operated at a hydration section speed $HS_{SPD}$, and the drying section 80 is operated at a drying section speed $DS_{SPD}$. Feeding the board segments 72 into the drying kiln 82 in the end-to-end relationship is achieved by adjusting the line speed of the conveyor belts 22 in at least one of the hydration and drying sections 76, 80. More specifically, the calculation module 54 calculates a predetermined gap adjustment value $GAP_{ADJ}$ based on at least one of the hydration section speed $HS_{SPD}$, the drying section speed $DS_{SPD}$, the gap G between adjacent boards 84, 86, and the predetermined board length L. An exemplary gap adjustment value $GAP_{ADJ}$ may be defined as provided by expression 6.

$$GAP_{ADJ}=f\{HS_{SPD},DS_{SPD},G,L\} \quad (6)$$

where a positive $GAP_{ADJ}$ automatically causes an increase of the gap G by providing less butting of the adjacent boards 84, 86, and a negative $GAP_{ADJ}$ automatically causes a decrease of the gap G by providing more butting of the adjacent boards 84, 86, such that the adjacent boards in the drying kiln 82 are closer to each other. Next, the speed adjustment module 50 adjusts the line speed of the conveyor belts 22 in each section 76, 80 based on the gap adjustment value $GAP_{ADJ}$.

Figure 6A:
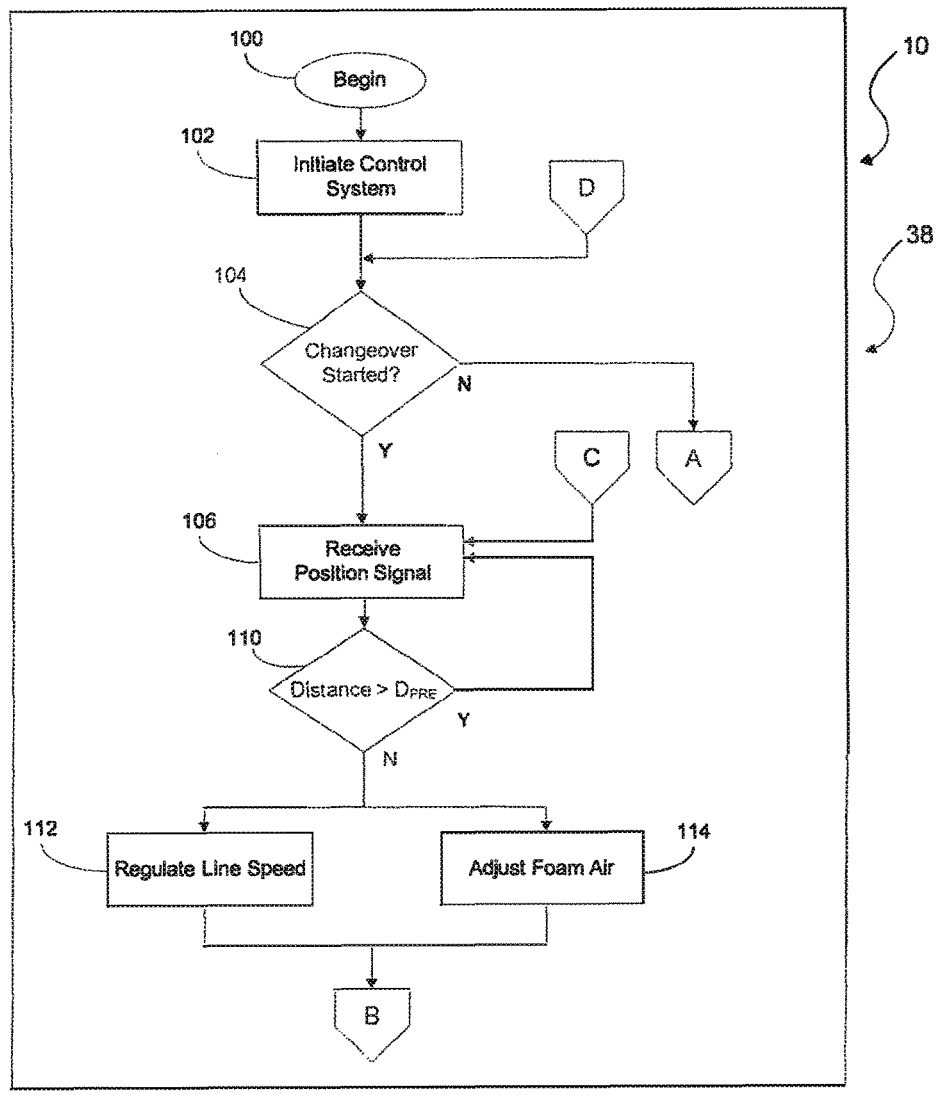
FIGS. 6A-6C illustrate an exemplary control method in accordance with an embodiment of the present control system.
Figure 6B:
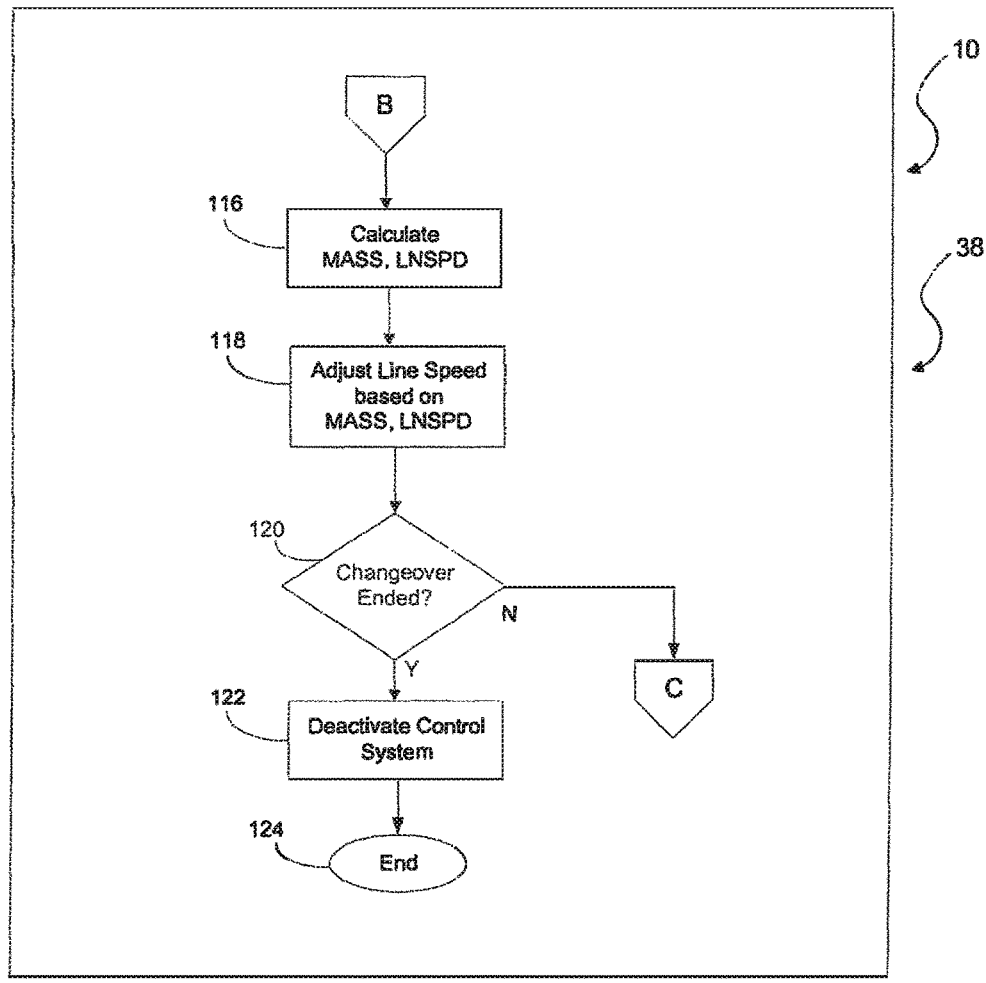
Figure 6C:
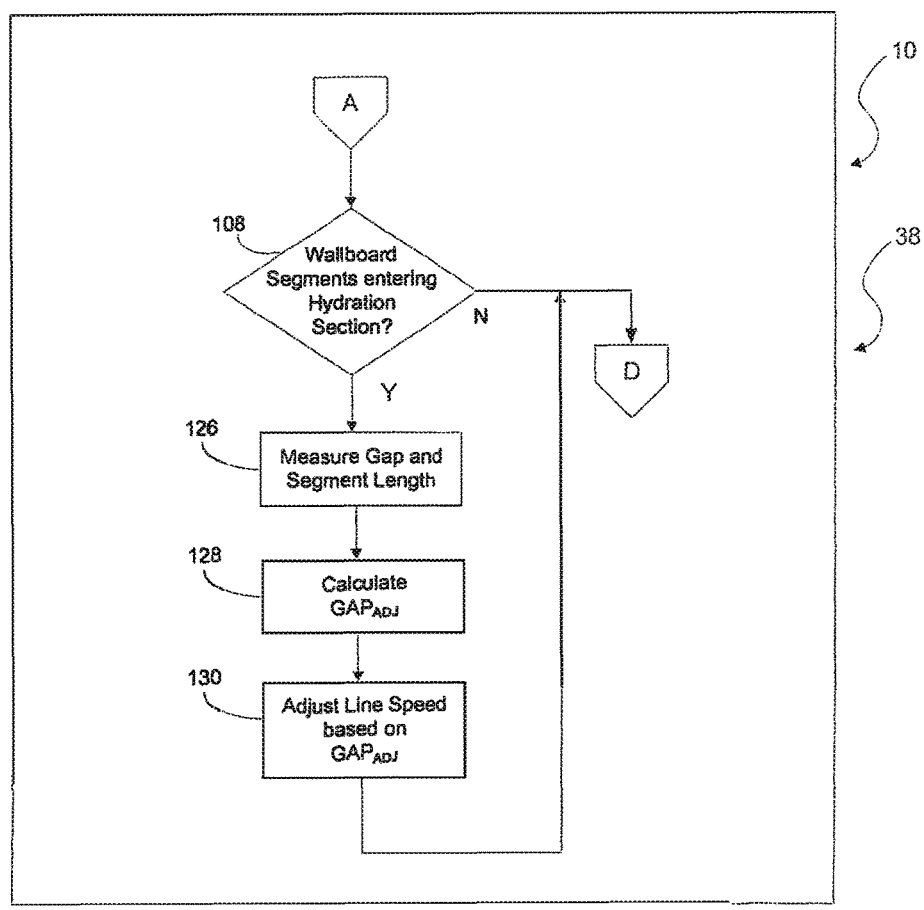

Referring now to FIGS. 6A-6C, an exemplary method of the control system 10 is shown using the present line speed control system 38. Although the following steps are primarily described with respect to the embodiments of FIGS. 1-5, it should be understood that the steps within the method may be modified and executed in a different order or sequence without altering the principles of the present disclosure.

The method begins at step 100. In step 102, the CCM 40 initiates operation of the line speed control system 38, and activates its children modules 44, 47, 48, 50, 52, 54, and other associated devices. More specifically, the interface module 44 initiates communications between the CCM 40 and peripheral software and hardware components, such as the position sensor 36, the database 42, and the conveyor belt motors 46.

In step 104, the CCM 40 determines whether the changeover period has started. If the changeover period has begun, control proceeds to step 106. Otherwise, control proceeds to step 108. In step 106, the position detection module 48 receives a position signal P from the position sensor 36 via the interface module 44. In step 110, the position detection module 48 determines a location of the slurry head 34 relative to the position sensor 36 based on the position signal P, and generates a distance value D. If the distance value D is greater than a predetermined distance $D_{PRE}$, control proceeds to step 106. If the distance value D is less than or equal to the predetermined distance $D_{PRE}$, control proceeds to steps 112 and/or 114.

In step 112, the speed adjustment module 50 regulates the line speed of the conveyor belt 22 based on at least one of the position signal P and the distance value D. In step 114, the foam air control module 52 controls an amount of air mixed into the slurry based on at least one of the position signal P and the distance value D. Both steps 112, 114 can be performed simultaneously, separately, or in a partial combination as required to suit the situation. For example, the line speed of the conveyor belt 22 and the amount of air mixed into the slurry can be adjusted sequentially or alternatively.

In step 116, the calculation module 54 calculates the predetermined mass rate MASS and the predetermined line speed LNSPD based on at least one of the first ingredient mass rate IMR1, the second ingredient mass rate IMR2, and the current conveyor line speed CLS. In step 118, the speed adjustment module 50 adjusts the line speed of the conveyor belt 22 based on at least one of the predetermined mass rate MASS and line speed LNSPD.

In step 120, the CCM 40 determines whether the changeover period has ended. If the changeover period has ended, control proceeds to step 122. Otherwise, control returns to step 106 to continue monitoring the position of the slurry head 34. In step 122, the CCM 40 deactivates the line speed control system 38, and control ends at step 124.

Returning to step 104, when the changeover is not detected by the CCM 40, control proceeds to step 108. In step 108, the CCM 40 determines whether the wallboard segments or panels 72 are entering into the hydration section 76. If the wallboard segments or panels 72 are sent to the hydration section 76 by the conveyor system 12, control proceeds to step 126. Otherwise, control proceeds to step 104 to determine whether the changeover period has started.

In step 126, the position detection module 48 measures the gap G between the adjacent board segments 84, 86, and the predetermined board length L based on a butting switch signal BS generated from the butting switch 78, and an elapsed time ET. The elapsed time ET refers to a time period between a first detection of a wallboard segment edge 88 and a second detection of another segment edge 88. A shorter period may indicate detection of the gap G, and a longer period may indicate detection of the board length L based on how long the butting switch 78 is activated (turned on) and deactivated (turned off) for.

In step 128, the calculation module 54 calculates the predetermined gap adjustment value $GAP_{ADJ}$ based on at least one of the hydration section speed $HS_{SPD}$, the drying section speed $DS_{SPD}$, the gap G between adjacent boards 84, 86, and the predetermined board length L. In step 130, the speed adjustment module 50 adjusts the line speed of the conveyor belts 22 in each section 76, 80 based on the gap adjustment value $GAP_{ADJ}$. Control proceeds to step 104.

While a particular embodiment of the present line speed control system has been described herein, it will be appreciated by those skilled in the art that changes and modifications may be made thereto without departing from the present disclosure in its broader aspects.

What is claimed is:

1. A system for controlling a conveyor system in a wallboard production line, comprising:
   a computer processor;
   a deadband tuning module for controlling at least one of
      a line speed of a conveyor belt, a foam air amount for
      a slurry, and an amount of water deposited into a mixer;
   wherein said deadband tuning module calibrates and sets
      a hysteresis threshold value based on input data of at
      least one of said line speed, said foam air amount, and
      said amount of water, said input data being collected
      over a predetermined period;
   a database for storing at least one statistical information of
      said input data during the predetermined period; and
   wherein said deadband tuning module determines a deadband range based on said hysteresis threshold value and
      said at least one statistical information using the processor.

2. The system of claim 1, wherein said deadband tuning module determines said hysteresis threshold value based on at least one of minimum, maximum, average, and standard deviation values of said input data.

3. The system of claim 1, wherein said deadband range is calibrated and overridden manually for locking in said deadband range at a desired offset from a predetermined value based on said input data.

* * * * *